United States Patent
Harper et al.

(10) Patent No.: US 7,469,385 B2
(45) Date of Patent: Dec. 23, 2008

(54) METHODS AND SYSTEMS FOR ABSTRACTION OF LOGICAL EDITING OPERATIONS

(75) Inventors: Mark Harper, Redmond, WA (US); Alex Mogilevsky, Bellevue, WA (US); Benjamin Westbrook, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 884 days.

(21) Appl. No.: 10/783,768

(22) Filed: Feb. 20, 2004

(65) Prior Publication Data

US 2005/0185920 A1 Aug. 25, 2005

(51) Int. Cl.
*G06F 3/00* (2006.01)
*G06F 3/14* (2006.01)

(52) U.S. Cl. .................. 715/765; 715/744; 715/788; 715/801; 715/243; 715/255

(58) Field of Classification Search ............... 715/700, 715/744, 764, 765, 788, 853, 500, 503, 504, 715/505, 508, 517, 520, 523, 530, 800, 801, 715/815, 200, 212, 217, 221, 225, 243, 246, 715/249, 255
See application file for complete search history.

(56) References Cited

U.S. PATENT DOCUMENTS

| | | | | |
|---|---|---|---|---|
| 3,979,965 | A | | 9/1976 | Vuceta .................... 74/410 |
| 5,276,793 | A | * | 1/1994 | Borgendale et al. ......... 715/513 |
| 5,801,688 | A | * | 9/1998 | Mead et al. ................ 715/700 |
| 5,802,380 | A | * | 9/1998 | Bangs et al. ................ 715/515 |
| 5,867,399 | A | | 2/1999 | Rostoker et al. ............ 364/489 |
| 5,873,106 | A | * | 2/1999 | Joseph .................... 715/506 |
| 5,920,870 | A | * | 7/1999 | Briscoe et al. ............ 707/103 R |
| 6,088,028 | A | | 7/2000 | Gipalo .................... 345/333 |
| 6,272,672 | B1 | | 8/2001 | Conway .................... 717/1 |
| 6,304,259 | B1 | * | 10/2001 | DeStefano .................. 715/805 |
| 6,348,934 | B1 | | 2/2002 | Gipalo .................... 345/762 |
| 6,412,031 | B1 | * | 6/2002 | Grooters ................... 710/36 |
| 6,671,802 | B1 | * | 12/2003 | Ott ........................ 713/100 |

(Continued)

OTHER PUBLICATIONS

"Structure, Abstraction, and Direct Manipulation in Diagram Editors," by O. Koth; M. Minas; Diagrammatic Representation and Inference. Second International Conference, Diagrams 2002; Proceedings (Lecture Notes in Computer Science, vol. 2317), p. 290-304, 2002.

(Continued)

*Primary Examiner*—X. L Bautista
(74) *Attorney, Agent, or Firm*—Merchant & Gould PC (57) ABSTRACT

Embodiments of the present invention relate to methods, systems, and computer-readable media for editing an object displayed by a computer system. Editing comprises detecting an edit operation for an object displayed on a video display of a computer system. An edit operation request is then sent to an abstraction layer via an interface provided by the abstraction layer to initiate editing of the object by the abstraction layer. The abstraction layer receives the edit operation request and determines the type of container in which the object is displayed based on properties related to the object to be edited. The abstraction layer reads a set of properties related to the object and the container in which the object is displayed. The abstraction layer may then edit the object based the properties of the container and object by modifying one or more of the properties of the container and object.

15 Claims, 8 Drawing Sheets

U.S. PATENT DOCUMENTS

| | | | | |
|---|---|---|---|---|
| 7,054,877 | B2* | 5/2006 | Dettinger et al. | 707/101 |
| 7,131,064 | B2* | 10/2006 | Dencker et al. | 715/513 |
| 7,155,681 | B2* | 12/2006 | Mansour et al. | 715/762 |
| 7,191,410 | B1* | 3/2007 | Kruempelmann et al. | 715/853 |
| 2003/0098880 | A1 | 5/2003 | Reddy et al. | 345/763 |
| 2003/0167274 | A1* | 9/2003 | Dettinger et al. | 707/100 |
| 2004/0117407 | A1 | 6/2004 | Kumar et al. | 707/200 |
| 2004/0205726 | A1 | 10/2004 | Chedgey et al. | 717/125 |

OTHER PUBLICATIONS

"Abstraction in Graph-Transformation Based Diagram Editors," by O. Koth; M. Minas; Electronic Notes in Theoretical Computer Science, vol. 50, No. 3; p. 1-7, 2001.

"Media Construction Formalism Specifying Abstractions for Multimedia Scenario Design," by J. Nanard; M. Nanard; P. King; New Review of Hypermedia and Multimedia, vol. 6, p. 47-48, 1999.

"Zodiac: A History-Based Interactive Video Authoring System," IEE, published Oct. 2003; Proceedings of ACM Multimedia '98; 1998, p. 435-443.

An Approach to Data Fusion Using Uncertain Knowledge in Geographical Information Systems, by Suzuki, M; Araki, D.; Higashide, A.; Suzuki, T., IEE, Electrical Engineering in Japan, v 128, n 4, Sep. 1999; pp. 65-76.

"Motion Abstraction and Mapping with Spatial Constraints," by R. Bindiganavale; N. Badler; Lecture Notes in Computer Science, vol. 1537, IEE, Proceedings of the International Workshop on Modeling and Motion Capture Techniques for Virtual Environments; 1998; p. 70-82.

"Supporting Tailorable Program Visualization Through Literate Programming and Fisheye Views," by A. Cockburn; IEE; Information and Software Technology, v 43, n 13, Nov. 15, 2001; pp. 745-758.

"Integrated Approach for Documenting, Exploring, and Building Framework-Based Software," by R. Weinreich; J. Pichler; 37th International Conference on Technology of Object-Oriented Languages and Systems, TOOLS-Pacific 2000; p. 316-327.

Gleicher, Michael, "Motion Path Editing", Proceedings 2001 ACM Symposium on Interactive 3D Graphics, Mar. 2001, pp. 195-202.

Hazelwood, Kim et al., "Creating Applications in RCADE", 1999 IEEE Aerospace Conference Proceedings, vol. 2, pp. 337-349.

Kacsuk, Peter et al., "The GRED Graphical Editor for the GRADE Parallel Program Development Environment", International Conference and Exhibition Amsterdam, The Netherlands, Apr. 21-23, 1998 Proceedings (High-Performance Computing and Networking, pp. 728-737).

Koch, Rolf et al., "Emotion Editing using Finite Elements", Eurographics '98, vol. 17, No. 3.

Kuhner, G. et al., "Editor for system configuration and experiment program specification", Fushion Engineering and Design 17 (2004) pp. 225-230.

Madsen, Ole Lehrmann, "Abstraction and Modularization in the BETA Programming Language," Modular Programming Languages, Joint Modular Languages Conference, JMLC 2000, pp. 211-237.

Schranz, Markus W. et al., "Engineering Complex WWW Services with JESSICA and UML", Proceedings of the 33rd Hawaii International Conference on System Sciences—2000, pp. 1-8.

Sheehan, Robert, "Incremental Control of a Children's Computing Environment," Human-Computer Interaction—INTERACT '99, pp. 504-509, 1999.

* cited by examiner

METHODS AND SYSTEMS FOR ABSTRACTION OF LOGICAL EDITING OPERATIONS

TECHNICAL FIELD

The present invention relates generally to the field of graphical user interfaces and more particularly to abstraction of logical editing operations performed on objects displayed on a graphical user interface.

BACKGROUND OF THE INVENTION

A visual display such as a graphical user interface presented by software may include objects and containers. An object can be any item on a visual display. A container can be an object upon or within which other objects are presented. For example, a container, such as a spreadsheet or word processing document, may include a number of objects, such as cells, graphics, user interface elements, and others. The objects within such a container may have a defined presentation size, position, etc. This presentation may be defined and edited dynamically by the software displaying the container and objects. For example, an object may be moved, resized, rotated, etc. within its container during execution of the software presenting that object. These editing actions may be initiated by a user action such as dragging and dropping an object using a mouse or other pointing device or may be initiated by the software itself in response to some other event.

Typically, a body of code within the application is responsible for arranging elements of a visual display such as objects and containers. For example, an application program presenting a number of objects includes code representing a layout editor, sometimes referred to as a "form editor" or "2D editor," for arranging and/or editing the appearance of the containers and objects presented by that application. However, to function properly, the layout editor requires specific, prior knowledge of the parent container for the objects to be edited. For example, the layout editor must have specific knowledge of the type of container, the size of the container and other attributes for that container in order to properly present the objects. This information is important to the layout editor because an object may be sized, positioned, etc, within its parent container differently based on the type of container in which it is placed. For example, depending on the type of container in which an object is displayed, a container may position the object based on an absolute position or size given in x,y coordinates and/or offset values, a radius and/or angular value, an ordinal value, and others. For example, if the container presents objects based on absolute positioning, the layout editor should use the absolute positioning values to edit the object. In another example, if the objects are positioned in a flowing manner from left to right along a top or bottom edge of the container an object ordinal value should be used to edit the position of the objects.

For the layout editor to have such specific knowledge of the parent container and change properties of the container and objects within that container based on that knowledge and the editing operation, the layout editor of the application consists of extensive code. Further complicating matters, an object may be placed on an arbitrary surface in a container that may arbitrarily arrange its children. Therefore, the changes made by the layout editor will be ineffective.

As such, there is no simple manner in which an application may arrange or edit objects on a display without consideration of the type of container in which the object will be placed. Additionally, an application's layout editor is limited to editing only objects within a container for which it has specific knowledge. It is with respect to these considerations and others that the present invention has been made.

SUMMARY OF THE INVENTION

In accordance with the present invention, the above and other problems are solved by an abstraction layer for use when performing logical editing operations. The abstraction layer provides a number of interfaces that may be used by application programs to perform various logical editing operations on objects and containers on a video display. For example, the abstraction layer may provide for moving, resizing, reordering, etc. a specified object. Through the abstraction layer interfaces to each of these operations, an application program may affect the editing operation without code specific to that editing operation and without knowledge of the object's parent container.

In accordance with still other aspects, the present invention relates to a method of editing objects displayed by a computer system. The method comprises detecting an edit operation for an object displayed on a video display of a computer system. An edit operation request is then sent to an abstraction layer via an interface provided by the abstraction layer to initiate editing of the object by the abstraction layer.

In accordance with other aspects, the present invention relates to a system for editing objects displayed on a video display. The system comprises a processor and a memory coupled with and readable by the processor. The memory contains instructions that, when executed by the processor, cause the processor to detect an edit operation for an object displayed on a video display of a computer system. An edit operation request is then sent to an abstraction layer via an interface provided by the abstraction layer to initiate editing of the object by the abstraction layer. The abstraction layer receives the edit operation request and determines the type of container in which the object is displayed based on properties related to the object to be edited. The abstraction layer then reads a set of properties related to the object to be edited and a set of properties related to the container in which the object is displayed. The abstraction layer may then edit the object based the properties of the container and object by modifying one or more of the properties of the container and object.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
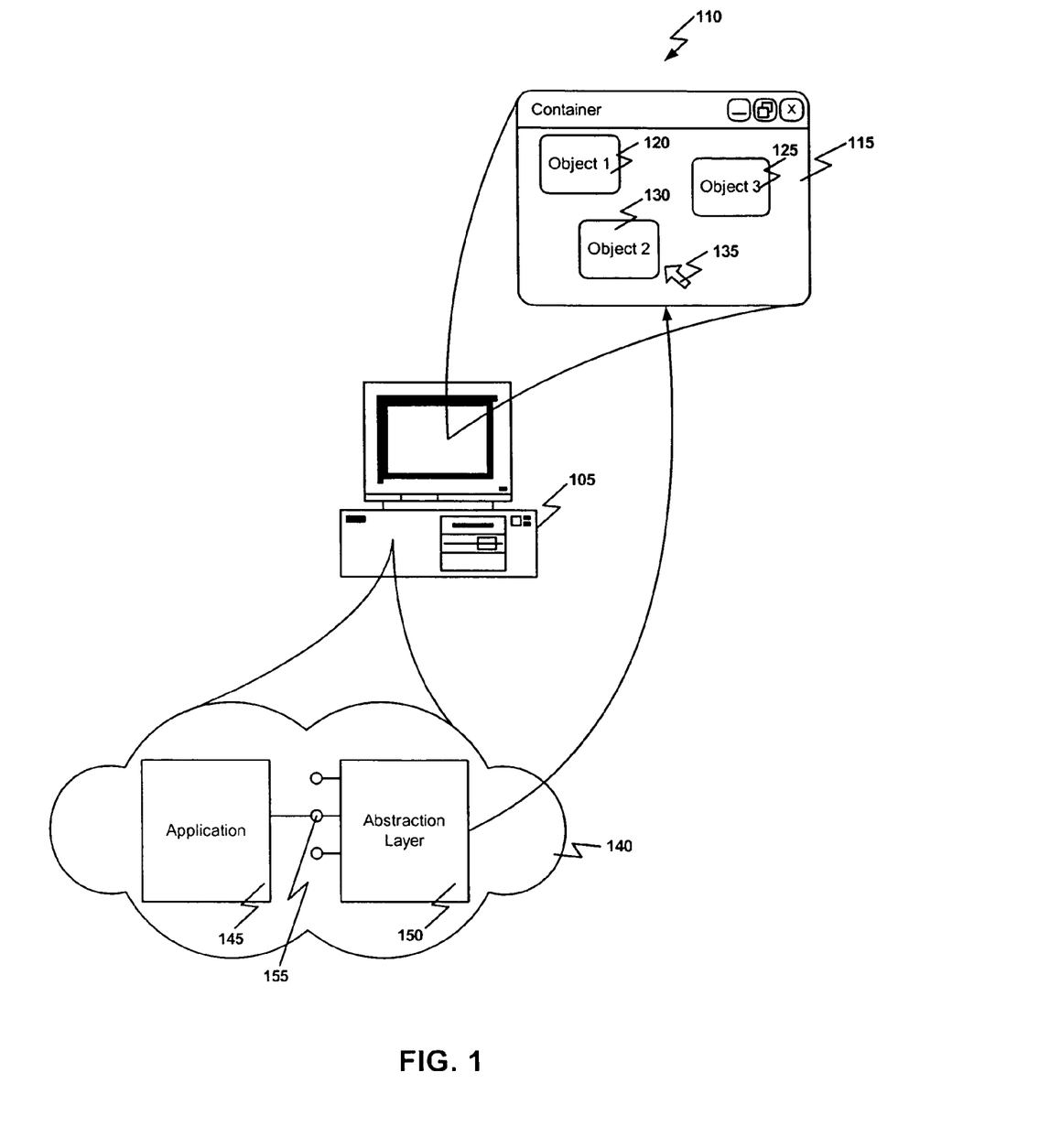
FIG. 1 illustrates abstraction of logical editing operations according to an embodiment of the present invention.

FIG. 1 illustrates abstraction of logical editing operations according to an embodiment of the present invention. In this example, a computer system 105 executes software 140 and provides a display 110 of information. The display 110 includes a container 115 that in turn includes a number of objects 120-130. The container 115 may be, as shown here, a window or another type of container such as a desktop, a document, a folder, or other object. The objects 120-130 within the container may be any of a variety of different objects such as user interface elements, graphics, blocks of text, etc. that may be arranged in any of a variety of ways. For example, the objects 120-130 may be arranged by absolute position based on x, y coordinates within the container 115 as shown here, flowing from left to right or right to left along the top or bottom of the container 115, docketed to an edge of the container 115 such as the left side or right side of the container 115, some combination of these arrangements, or in another arrangement.

Also shown on the display 110 is a cursor 135 that may be moved by a user of computer system 105 using a mouse or other pointing device to select and/or manipulate the objects 120-130. For example, a user, by manipulating a mouse, may position the cursor over an object and select and move, i.e., drag and drop, an object to move that object. In another example, a user may resize or rotate an object by dragging and dropping an edge or corner of the object.

Software 140 executed on the computer system 105 may include one or more applications 145. The application 145, such as a word processor, spreadsheet, web browser, or other program, may generate the container 115 and/or the objects 120-130 contained therein. To arrange and edit the objects, the application uses the abstraction layer 150. That is, rather than directly arranging and editing the objects 120-130 which would require specific layout algorithms within the application, the application 145 calls, invokes, instantiates, or otherwise initiates execution of the abstraction layer 150. The abstraction layer 150 then, with knowledge of the container 115 and objects 120-130, positions or edits the objects 120-130 within the container 115 on the display 110.

The abstraction layer 150 may obtain knowledge of the objects 120-130 and container 115 in a variety of ways. For example, the abstraction layer may read a type attribute for each object and the container. Alternatively, the abstraction layer may read a property setting for each object and the container. In another example, the abstraction layer may read an object type and/or container type from a registry or other persistent memory.

When a user of the computer system 105 uses a mouse or other pointing device to select or manipulate the objects 120-130, the application 145 may use an interface 155 provided by the abstraction layer 150 to initiate an appropriate logical editing operation. For example, a user may manipulate the cursor 135 to select and move, i.e. drag-and-drop, one of the objects 130. In such a case, the application 145 may call, invoke, instantiate, or otherwise initiate execution of a move method or operation of the abstraction layer 150 through a corresponding interface 155 of the abstraction layer 150. In this way, the application 145 need not contain code for editing or arranging the objects 120-130 in the container 115. The application 145 simply detects the editing operation and passes the appropriate parameters to the abstraction layer 150.

The abstraction layer 150 may represent a class with specific knowledge, i.e., properties of the object and its container. Having this knowledge allows the abstraction layer 150 to make specific changes to affect the editing action. The abstraction layer 150, by presenting a number of methods, allows editing operations such as move, resize, rotate, stretch, skew, etc. to be applied to a container or objects within that container without requiring the application 145 to know how objects are positioned or arranged within the container. That is, the abstraction layer 150 translates logical editing operations such as move or resize into changes to object-specific properties such as width, height, absolute position, etc. depending upon the object and container. Additionally, the abstraction layer 150 handles editing of objects when the container controls the display of the object. For example, the parent container may, depending upon its type, control the positioning of the object. In such a case, the abstraction layer 150 may edit the properties of the container to affect the editing operation on the object.

The abstraction layer 150 may also allow more than one application 145 to easily modify the same object and/or container. For example, since specific knowledge of the object and container is available to the abstraction layer 150, applications do not need to obtain or maintain this information. In order to edit an object or container, the application simply accesses the logical editing operation via the appropriate interface of the abstraction layer. That is, if the abstraction layer 150 is implemented as a class, multiple applications may access the logical editing operations of that class by instantiating an object of that class and invoking the method for performing the desired operation using the appropriate interface.

Figure 2:
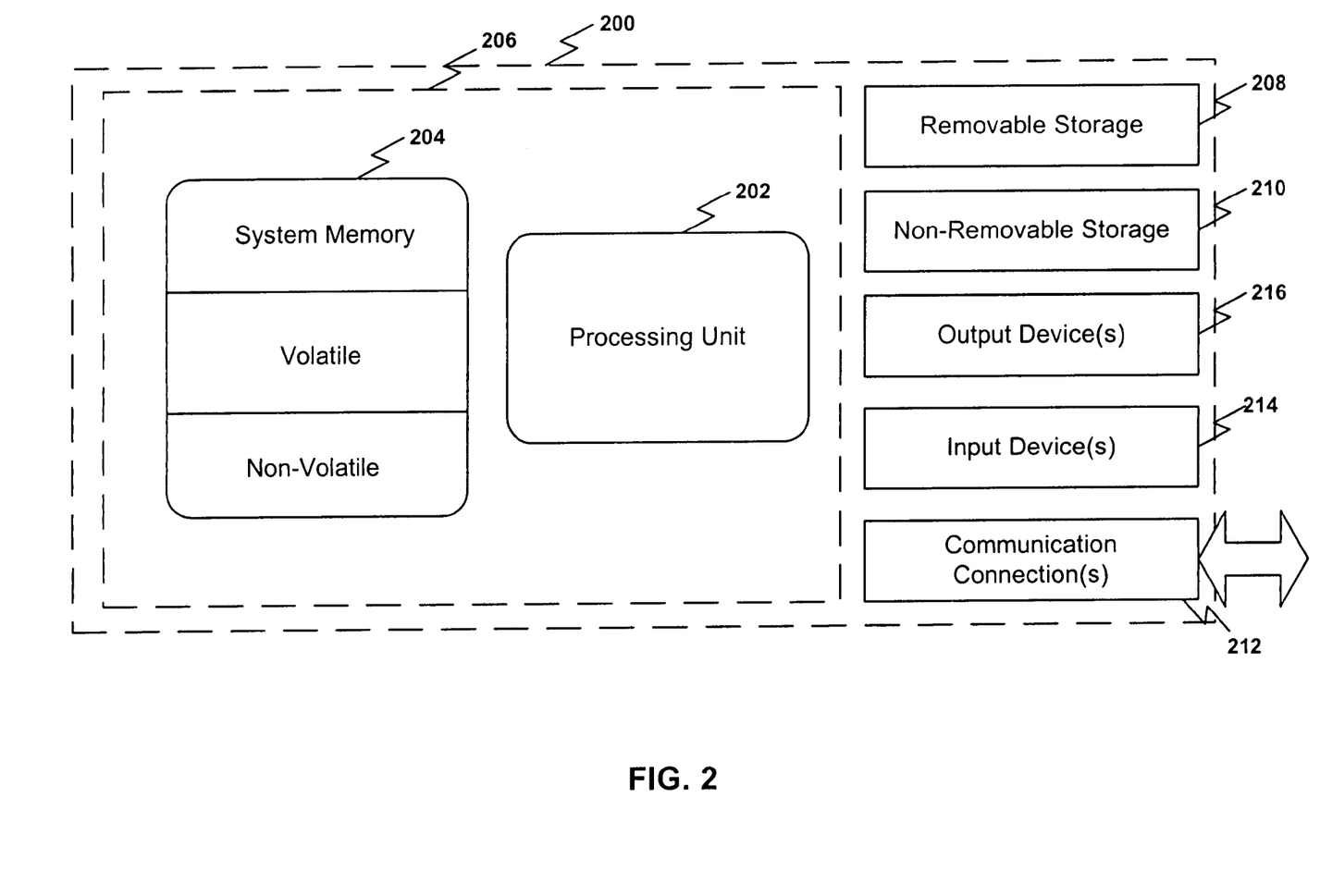
FIG. 2 illustrates an example of a suitable computing system environment on which embodiments of the invention may be implemented.

FIG. 2 illustrates an example of a suitable computing system environment on which embodiments of the invention may be implemented. This system 200 is representative of one that may be used to serve as the computer system 105 described above. In its most basic configuration, system 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206. Additionally, system 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 typically includes communications connection(s) 212 that allow the system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 200 may also have input device(s) 214 such as keyboard, mouse, pen, voice input device, touch input device, etc. Output device(s) 216 such as a display, speakers, printer, etc. may also be included. All these devices are well know in the art and need not be discussed at length here.

A computing device, such as system 200, typically includes at least some form of computer-readable media. Computer readable media can be any available media that can be accessed by the system 200. By way of example, and not limitation, computer-readable media might comprise computer storage media and communication media.

Figure 3:
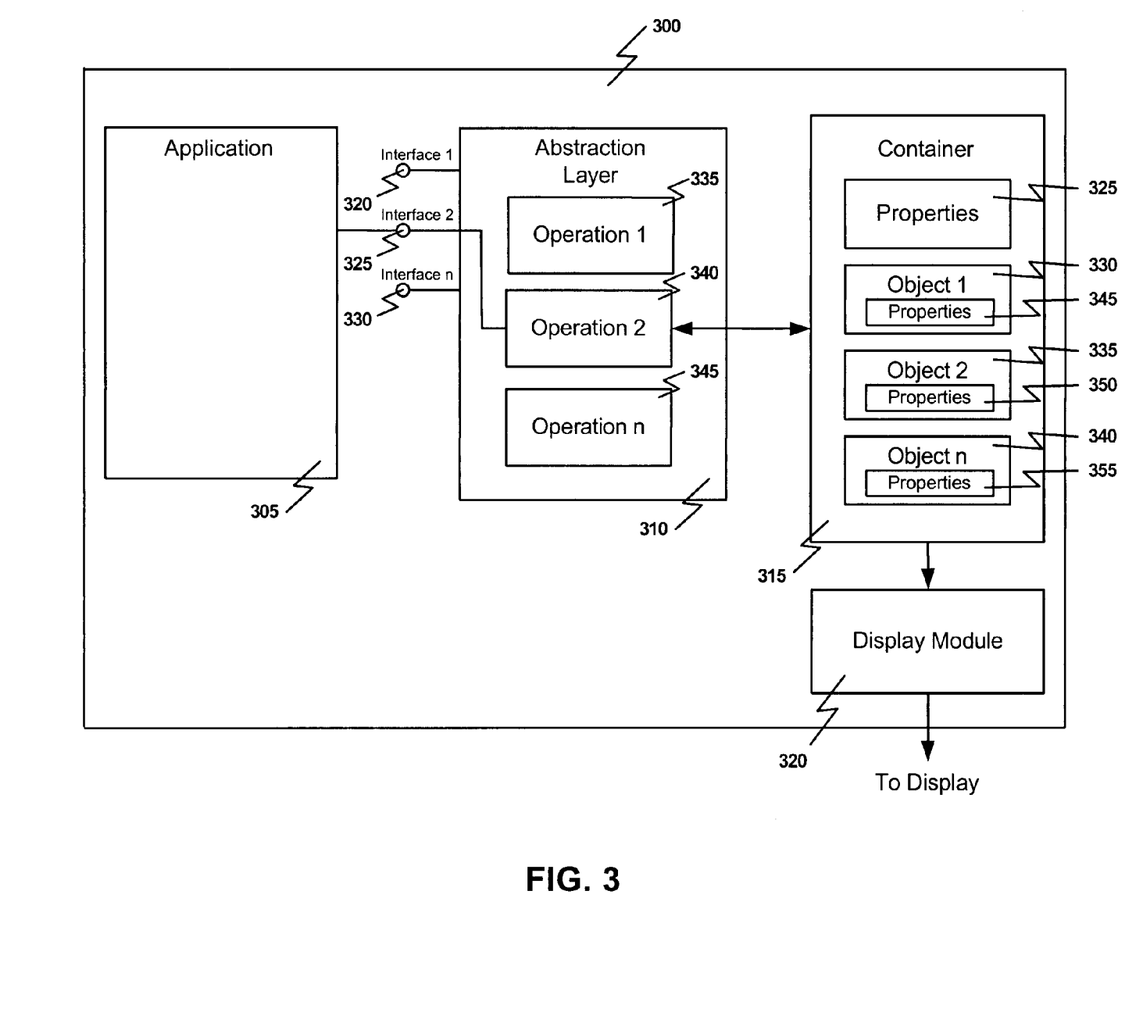
FIG. 3 illustrates functional components of a system for abstraction of logical editing operations according to an embodiment of the present invention.

FIG. 3 illustrates functional components of a system for abstraction of logical editing operations according to an embodiment of the present invention. As shown here, a computer system 300, such as system 200 above, may execute one or more applications 305. The application 305 may be any of a variety of possible applications such as a word processor, web browser, email program, or other type of software. The application 305 detects editing operations performed on objects being displayed. For example, a user may select an edge of an object being displayed and drag the edge to resize the object. Once an editing operation is detected, the application 305 may request the abstraction layer 310 to perform the appropriate editing operation using an interface 325 provided by the abstraction layer 310. The display module 315 of the computer system 300 displays the objects 330-340 and container 315 based in part on properties 325 of the container 315 as well as properties 345-355 of the objects 330-340.

The abstraction layer 310 includes a number of interfaces 320-330 through which the application 305 may initiate a number of corresponding editing operations 335-345. The interfaces 320-330 and corresponding operations 335-345 may represent any of a variety of possible editing operations that may be performed by the abstraction layer 310. For example, the abstraction layer 310 may provide for moving, resizing, re-ordering, rotating, skewing, or otherwise manipulating the appearance of the objects within the container. Of course, many other possible editing operations may be performed depending upon the exact nature of the container and object and the properties available for those elements. Other editing operations may involve manipulating any property of the object, not necessarily positional properties. For example, sound, text, colors and other properties of the object may be edited by the abstraction layer. Additionally, creating, deleting, copying objects or data can also be done via logical operations through the abstraction layer.

As mentioned above, embodiments of the present invention may be implemented utilizing object-oriented programming techniques. For example, the container 315 and objects 330-340 may be implemented as instances of a class of a given type. The abstraction layer 310 may also be implemented as an instance of a class. Further, the abstraction layer 310 may inherit the properties 325 of the container 315 as well as the properties 345-350 of each object 330-340. In this way, the abstraction layer 310 may have specific knowledge of the objects 330-340 and the container 315. The abstraction layer class can also provide methods defined for that class representing the logical editing operations 335-345 through the interfaces 320-330. Therefore, when the application 305 invokes a particular logical editing operation 340 through an interface 325, the corresponding method for that operation 340 may modify properties 325 for the container 315 and/or properties 345-355 for one or more objects 330-340.

The operations of the abstraction layer generally consist of receiving the edit operation and other parameters from the application 305 through an interface 325. For example, an interface for executing a move operation may have a parameter for identifying the object to be moved and a parameter for the amount or distance the object should be moved. The abstraction layer 310 then determines the object to be edited from the parameters and determines the objects container. The abstraction layer 310 then determines the container's type. The abstraction layer 310 may obtain knowledge of the objects 330-340 and container 315 in a variety of ways. For example, the abstraction layer may read a type attribute for each object and the container. Alternatively, the abstraction layer may read a property setting for each object and the container. In another example, the abstraction layer may read an object type and/or container type from a registry or other persistent memory. Types of containers that may be used may include, but are not limited to, an absolute positioning type, a flowing type, and a docking type. Based on the type of container, the abstraction layer 310 may then perform the appropriate editing operation by modifying the properties of the object being edited and/or the container for that object.

For example, an application, responsive to input from a user or some other event, may request a move operation by calling, invoking, instantiating, or otherwise initiating the move operation of the abstraction layer using the move interface. The application, when initiating the move operation may supply an indication of the distance to be moved or a destination location for the object along with the name or other identification of the object to be moved. The abstraction layer move operation can then identify the object's parent container from the object's properties, determine the parent container's type from the properties of that container or other data, and edit the properties of the container and/or object to affect the move based on how the container arranges it objects. So, if, for example, the container arranges objects therein by an absolute position, the object's x,y coordinates may be edited by the move operation of the abstraction layer. If, in another example, the container arranges objects in a flowing manner, the ordinal value of the object may be edited by the move operation of the abstraction layer.

As mentioned above, the abstraction layer 310 may be implemented as an object oriented class of a predefined type having the methods and properties described. It should be noted that the abstraction layer 310 may represent multiple instances of this class. For example, one instance may be used for each object in a particular container. Additionally, one instance may be used for the container itself. Therefore, the instance for the container and the instances for the objects may, in some cases function independently. There may also be multiple instances for the same object to affect different editing operations. For example, editing operations that affect the container only need not involve the instances for the objects within that container. Different editing operations such as move and rotation could be done by the same or different instances of the abstraction layer. Further, if the abstraction layer is implemented as a class, the class may be made extensible to allow the addition of new operations. For example, various types of three dimensional editing operations may be added.

Various type of containers may be used when displaying objects. Editing operations performed on objects within these containers may depend on the type of container used. Container types that may be used include but are not limited to an absolute positioning type container, a flowing type container, and a docking type container. The following discussion of these container types is offered by way of example and not limitation. Various other types of containers and combinations of these and other containers are contemplated.

Figure 4:
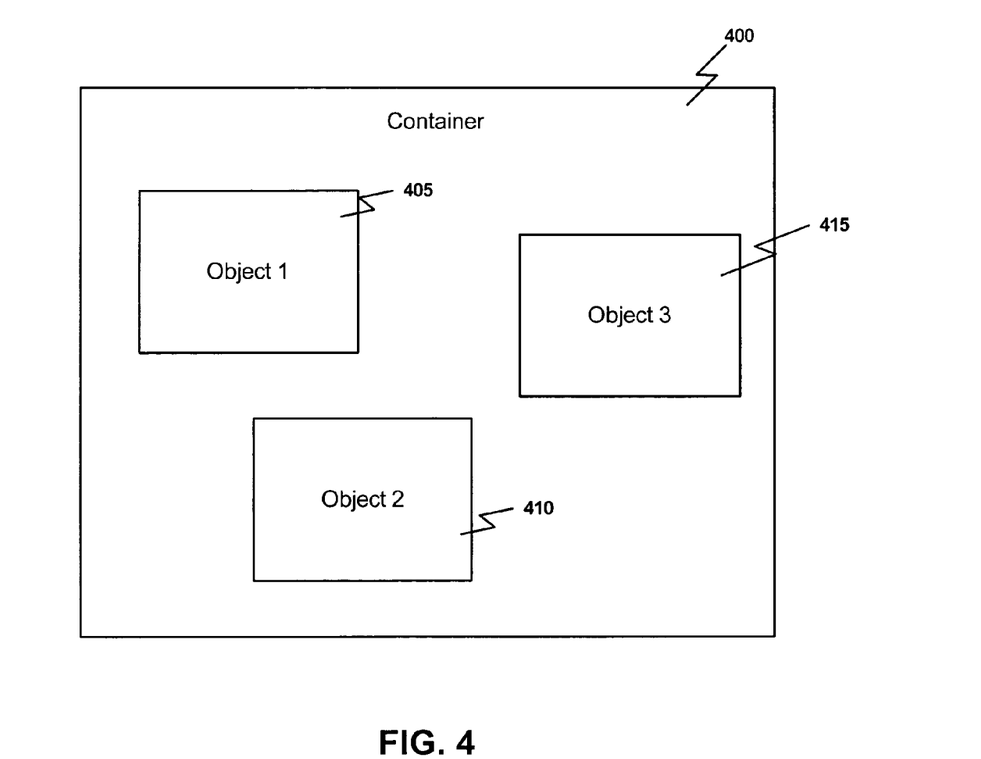
FIG. 4 illustrates an absolute positioning type of container in which objects may be edited by embodiments of the present invention.

FIG. 4 illustrates an absolute positioning type of container in which objects may be edited by embodiments of the present invention. A well-known example of this type of container is a desktop such as the Microsoft Windows® desktop. In this type of container 400, one or more objects 405-415 are arranged based on an x,y coordinate within the container 400. That is, each object has a property indicating the coordinates for at least one of its corners or another anchor. Additionally, each object may also have a property indicating its size. Size may be determined by height and width properties for the object.

The objects presented in an absolute positioning container may be positioned anywhere within the container. The objects may be moved, resized, rotated, etc. by editing the position and size properties for the object. Further, editing one object in this type of container may be performed independent of any other object within the same container or the container itself. That is, properties of the container or other objects need not be edited when editing one of the objects.

Figure 5:
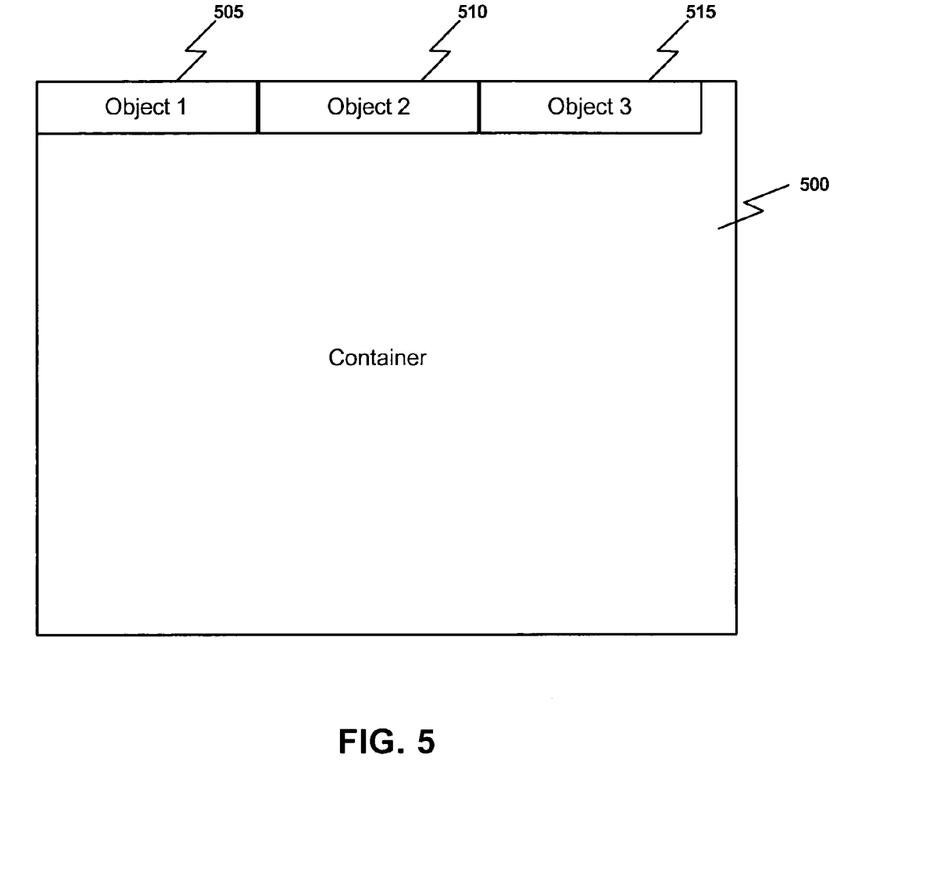
FIG. 5 illustrates a flowing type of container in which objects may be edited by embodiments of the present invention.

FIG. 5 illustrates a flowing type of container in which objects may be edited by embodiments of the present invention. This type of container 500 includes a number of objects 505-515 arranged in order, from left to right or right to left across the top or bottom of the container. A well-known example of this type of container is the menu bar or tool bar common on many applications. The objects in this type of container may be arranged based on an order property for each object. Alternatively, the order may be indicated as an ordinal value for each object, or child, that is a property of the container. These objects likely do not have an absolute position since such a property is not relevant to how the container arranges these objects. However, the objects may have properties indicating a size such as height and width.

The objects of a flowing container may be edited by modifying the order property or the size properties. For example, moving an object may be performed by modifying the order properties of the various objects in the container or changing the ordinal position in the container's child list. Similarly, resizing an object may be accomplished by changing the height and/or width properties.

Figure 6:
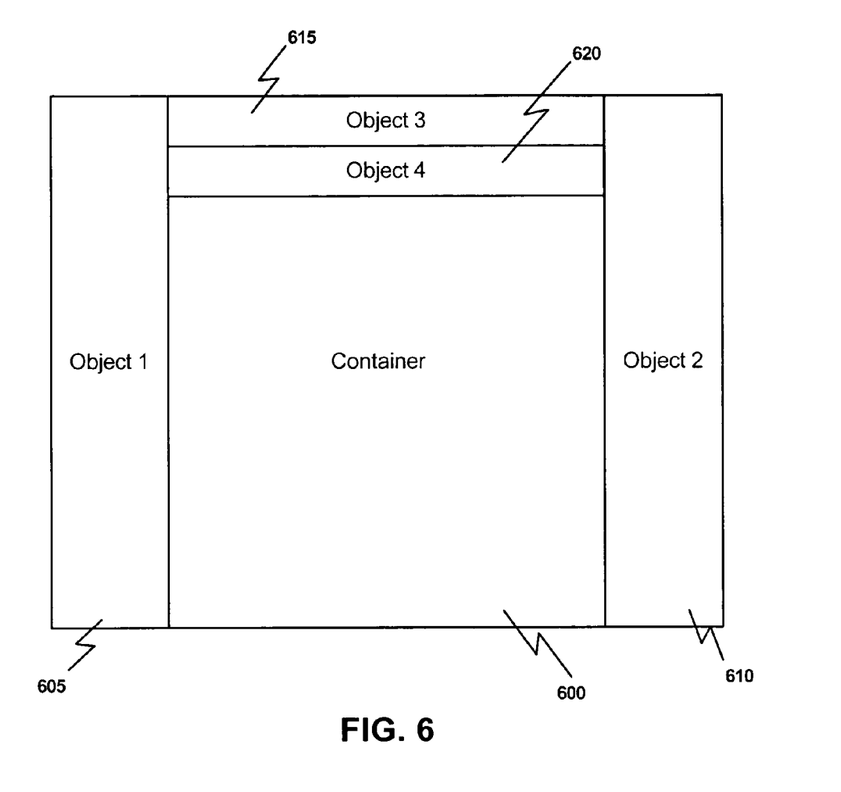
FIG. 6 illustrates a docking type of container in which objects may be edited by embodiments of the present invention.

FIG. 6 illustrates a docking type of container in which objects may be edited by embodiments of the present invention. A docking type container 600 includes one or more objects 605 affixed to the left portion of the container 600 and/or one or more objects 610 affixed to the right portion of the container 600. Additionally, one or more objects 615 and 620 may be docked or affixed to the top or bottom of the container. For this type of container, an object docketed to the top or bottom may have a height property but not a width property. Objects docketed to the left or right side may have a width property but not a height property. Additionally, the object or the container may have an ordinal value or child list to indicate an order for multiple objects docked to the same side. Therefore, an object may be moved by changing its docking property or its ordinal value. An object may be resized by changing its height or width. However, extending an object in the direction of a side to which it is docketed may be disallowed.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 7:
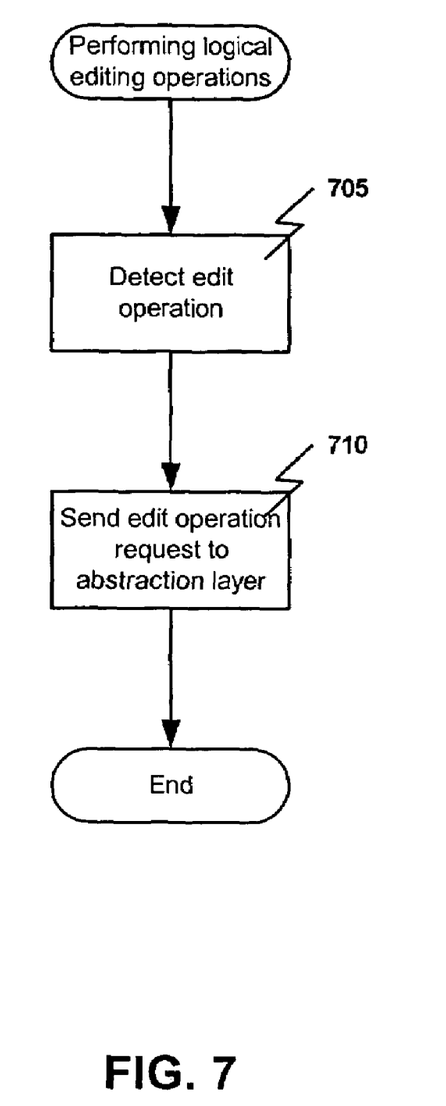
FIG. 7 is a flowchart illustrating performing logical editing operations according to an embodiment of the present invention.

FIG. 7 is a flowchart illustrating performing logical editing operations according to one embodiment of the present invention such as may be performed by an application program. Here, operation begins with detect operation 705. Detect operation 705 detects whether an edit operation should be performed on an object or container. This may be based on a user input from a keyboard, mouse or other pointing device when a user drags and drops or otherwise manipulates objects or containers on the video display of the computer systems.

Next, send operation 710 sends an edit operation request to the abstraction layer. As discussed above, the abstraction layer provides a number of interfaces for requesting logical edit operations. Therefore, send operation 710 may comprise using one of these interfaces to cause the abstraction layer to perform an associated logical edit operation. That is, the application may invoke or request an editing operation of the abstraction layer by calling that operation with the corresponding interface. This call may be associated with one or more parameters indicating, for example, the object to be edited and other values such as an offset, distance, location, etc.

Figure 8:
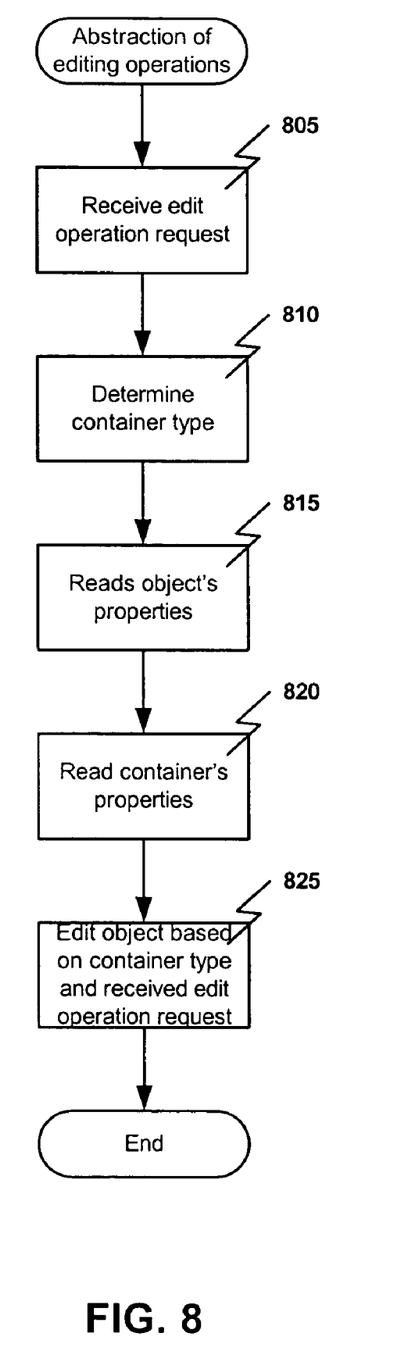
FIG. 8 is a flowchart illustrating abstraction of logical editing operations according to an embodiment of the present invention.

FIG. 8 is a flowchart illustrating abstraction of logical editing operations according to an embodiment of the present invention. These operations may be performed by the abstraction layer in response to receiving an edit operation request, via an interface, from an application program. In this example, operation begins with receive operation 805. Receive operation 805 receives the edit operation request from the application program. That is, the abstraction layer receives via an interface a request for an edit operation when the application program, upon determining that an edit operation should be performed based on some user input or other event. Additionally, receive operation 805 may also receive a number of parameters associated with the editing operation. For example, a move operation request may be associated with an offset or distance value to be used by the editing operation of the abstraction layer.

Once the abstraction layer has received the edit operation, the abstraction layer, at determine operation 810 determines the type of container in which the object to be edited is displayed. As mentioned above, the abstraction layer may obtain knowledge of the objects and container in a variety of ways. For example, the abstraction layer may read a type attribute for each object and the container. Alternatively, the abstraction layer may read a property setting for each object and the container. In another example, the abstraction layer may read an object type and/or container type from a registry or other persistent memory.

Next, at read operation 815, the abstraction layer retrieves the object's properties. These attributes may be stored as properties of the class instance for that object. Alternatively, the type and other attributes may be stored in a registry or other persistent memory in another common manner. The various properties of the objects may indicate the size, position, and other attributes to be used by the editing operation.

At read operation 820 the abstraction layer reads the properties of the container in which the object is displayed. These attributes may be stored as properties of the class instance for that container. Alternatively, the type and other attributes may be stored in a registry or other persistent memory in another common manner. The various properties of the container may indicate the size, position, and other attributes to be used by the editing operation.

Next, at edit operation 825, the abstraction layer performs the indicated editing function by modifying the properties of the object and/or the container. As described above, the object and/or the container may be edited by modifying the various properties of the object or container. For example, an object may be moved by modifying the absolute position properties or the ordinal value properties depending upon the type of container. In another example, an object may be resized by modifying a height and/or width property. Of course, many other possible editing operations may be performed depending upon the exact nature of the container and object and the properties available for those elements. Other editing operations may involve manipulating any property of the object, not necessarily positional properties. For example, sound, text, colors and other properties of the object may be edited by the abstraction layer. Additionally, creating, deleting, copying objects or data can also be done via logical operations through the abstraction layer.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A method of editing objects displayed on a video display by a computer system, the method comprising:
   detecting by an application running in the computer system an edit operation request for an object displayed on the video display by the computer system associated with said application;
   sending, by said application, one or more parameters associated with said edit operation request to an abstraction layer via an interface provided by said abstraction layer to initiate editing of said object by said abstraction layer;
   receiving by said abstraction layer said one or more parameters associated with said edit operation request;
   determining by said abstraction layer a container type for a container in which said object is displayed;
   reading by said abstraction layer a set of properties related to said object to be edited;
   reading by said abstraction layer a set of properties related to said container in which said object is displayed; and
   editing said object based on said container type and said one or more parameters associated with said edit operation request.

2. The method of claim 1, wherein editing said object comprises modifying a one or more properties of said object.

3. The method of claim 1, wherein editing said object comprises modifying a one or more properties of said container.

4. The method of claim 1 further comprising:
   implementing said abstraction layer as a class, wherein a plurality of applications may access said interface provided by said abstraction layer to initiate editing of said object by said abstraction layer.

5. The method of claim 1 further comprising:
   inheriting by said abstraction layer said set of properties related to said object to be edited and said set of properties related to said container in which said object is displayed.

6. A system for editing objects displayed on a video display comprising:
   a processor; and
   a memory coupled with and readable by the processor and containing instructions associated with an application that, when executed by the processor, cause the processor to detect an edit operation request for an object displayed on the video display by the computer system associated with said application, send one or more parameters associated with said edit operation request to an abstraction layer via an interface provided by said abstraction layer to initiate editing of said object by said abstraction layer causing said abstraction layer to receive said one or more parameters associated with said edit operation request, determine a container type for a container in which said object is displayed, read a set of properties related to said object to be edited, read a set of properties related to said container in which said object is displayed, and edit said object based on said container type and said one or more parameters associated with said edit operation request.

7. The system of claim 6, wherein editing said object comprises modifying a one or more properties of said object.

8. The system of claim 6, wherein editing said object comprises modifying a one or more properties of said container.

9. The system of claim 6, wherein said abstraction layer is implemented as a class, wherein a plurality of applications may access said interface provided by said abstraction layer to initiate editing of said object by said abstraction layer.

10. The system of claim 6, wherein said abstraction layer inherits said set of properties related to said object to be edited and said set of properties related to said container in which said object is displayed.

11. A tangible machine-readable storage medium encoding a computer program of instructions for editing objects displayed on a video display by a computer system, said computer process comprising:

detecting by an application running in the computer system an edit operation request for an object displayed on the video display by the computer system associated with said application;

sending, by said application, one or more parameters associated with said edit operation request to an abstraction layer via an interface provided by said abstraction layer to initiate editing of said object by said abstraction layer;

receiving by said abstraction layer said one or more parameters associated with said edit operation request;

determining by said abstraction layer a container type for a container in which said object is displayed;

reading by said abstraction layer a set of properties related to said object to be edited;

reading by said abstraction layer a set of properties related to said container in which said object is displayed; and editing said object based on said container type and said one or more parameters associated with said edit operation request.

12. The tangible machine-readable storage medium of claim 11, wherein editing said object comprises modifying a one or more properties of said object.

13. The tangible machine-readable storage medium of claim 11, wherein editing said object comprises modifying a one or more properties of said container.

14. The tangible machine-readable storage medium of claim 11 further comprising:

implementing said abstraction layer as a class, wherein a plurality of applications may access said interface provided by said abstraction layer to initiate editing of said object by said abstraction layer.

15. The tangible machine-readable storage medium of claim 11 further comprising:

inheriting by said abstraction layer said set of properties related to said object to be edited and said set of properties related to said container in which said object is displayed.

* * * * *

UNITED STATES PATENT AND TRADEMARK OFFICE
CERTIFICATE OF CORRECTION

| | | |
|---|---|---|
| PATENT NO. | : 7,469,385 B2 | Page 1 of 1 |
| APPLICATION NO. | : 10/783768 | |
| DATED | : December 23, 2008 | |
| INVENTOR(S) | : Mark Harper et al. | |

It is certified that error appears in the above-identified patent and that said Letters Patent is hereby corrected as shown below:

Title page, item (57), under "Abstract" column 2, line 13, after "based" insert -- on --.

Signed and Sealed this
Third Day of May, 2011

David J. Kappos
*Director of the United States Patent and Trademark Office*